(12) United States Patent
Kusumoto et al.

(10) Patent No.: US 6,255,021 B1
(45) Date of Patent: Jul. 3, 2001

(54) LITHIUM BATTERY INCLUDING STORAGE STABILIZED DIOXOLANE-CONTAINING ELECTROLYTE

(75) Inventors: Yasuyuki Kusumoto; Seiji Yoshimura; Toshiyuki Nohma; Koji Nishio, all of Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/124,792

(22) Filed: Jul. 30, 1998

(30) Foreign Application Priority Data

Aug. 4, 1997 (JP) .................................................. 9-209101
Aug. 5, 1997 (JP) .................................................. 9-210870

(51) Int. Cl.[7] ...................................................... H01M 6/16

(52) U.S. Cl. .......................... 429/328; 429/329; 429/337; 429/339; 429/341; 429/224; 429/231.1; 429/231.95

(58) Field of Search ..................................... 429/329, 337, 429/345, 347, 231.95, 328, 341, 339, 224, 231.1

(56) References Cited

U.S. PATENT DOCUMENTS

| 4,419,422 | * | 12/1983 | Leger et al. | 429/218.1 |
|---|---|---|---|---|
| 4,489,144 | * | 12/1984 | Clark | 429/218.1 |
| 4,737,424 | | 4/1988 | Tobishima et al. | 429/197 |
| 5,393,620 | * | 2/1995 | Manaresi et al. | 429/314 |
| 5,478,673 | | 12/1995 | Funatsu | 429/197 |
| 5,558,953 | | 9/1996 | Matsui et al. | 429/194 |
| 5,580,684 | * | 12/1996 | Yokoyama et al. | 429/194 |

FOREIGN PATENT DOCUMENTS

| 62-90869 | 4/1987 | (JP) . |
|---|---|---|
| 62-219475 | 9/1987 | (JP) . |
| 6-10995 B2 | 2/1994 | (JP) . |

* cited by examiner

Primary Examiner—Laura Weiner
(74) Attorney, Agent, or Firm—Kubovcik & Kubovcik

(57) ABSTRACT

A nonaqueous electrolyte battery having improved storage stability is disclosed. The battery includes a positive electrode; s negative electrode in which the active material is lithium or a compound capable of absorbing and desorbing lithium; and a nonaqueous electrolyte containing an organic solvent, at least 10 wt % of which is dioxolane, a solute and a storage stabilizing additive which is an oxygen acid ester, isoxazole, oxazole or oxazoline or a derivative thereof. The additive reduces the self-discharge rate of the battery during storage.

9 Claims, 1 Drawing Sheet

LITHIUM BATTERY INCLUDING STORAGE STABILIZED DIOXOLANE-CONTAINING ELECTROLYTE

FIELD OF THE INVENTION

The present invention relates to an improvement in the storage property of a nonaqueous electrolyte battery which uses lithium as a negative electrode active material, i.e., a lithium battery.

BACKGROUND OF THE INVENTION

Lithium batteries which use lithium as the negative electrode active material have lately attracted attention as high energy density batteries, and much active research has been conducted.

As a solvent of the nonaqueous electrolyte for these types of batteries, ethylene carbonate, propylene carbonate, butylene carbonate, dimethyl carbonate, diethyl carbonate, sulfolane, 1,2-dimethoxydiethane, tetrahydrofuran and dioxolane and the like can be used alone or in the form of a mixture of two or three of these substances. As a solute dissolved in the solvent there can be mentioned $LiPF_6$, $LiBF_4$, $LiClO_4$, $LiCF_3SO_3$, $LiAsF_6$, $LiN(CF_3SO_2)_2$, $LiCF_3(CF_2)_3SO_3$ or the like.

It is a problem that an organic solvent and a negative electrode having lithium as an active material react chemically in nonaqueous electrolyte consisting of a solute and, as a solvent, dioxolane alone or a two or three component solvent including dioxolane and reduce battery capacity after storage. Therefore, it is very important to inhibit self-discharge during storage to put this kind of battery to practical use.

Japanese patent publication (Laid-Open) Sho 60-91565 discloses a battery having improved properties and which uses a nonaqueous electrolyte including dioxolane as a solvent. However, it is a problem when dioxolane is used as solvent that a negative electrode in which lithium is an active material reacts chemically with the dioxolane, and reduces battery capacity after storage.

Japanese patent publication (Laid-Open) Sho 49-108525 discloses that pyridine is added to an electrolyte to improve storage properties. However, even if pyridine is added to an electrolyte, sufficient improvement is not obtained in a battery in which an organic solvent containing dioxolane is used. Further improvement is required.

OBJECT OF THE INVENTION

An object of the present invention is to reduce self-discharge during storage of a nonaqueous electrolyte battery and to provide a nonaqueous electrolyte battery having excellent storage properties.

SUMMARY OF THE INVENTION

The present invention provides a nonaqueous electrolyte battery having a positive electrode, a negative electrode comprising lithium or a material capable of absorbing and desorbing lithium, an organic solvent containing dioxolane and a solute, wherein the dioxolane is 10 wt % or more of the organic solvent, and the organic solvent contains a storage stabilizing additive selected from the group consisting of an oxygen acid ester, isoxazole, oxazole, oxazoline and derivatives thereof.

When the storage stabilizing additive selected from the group consisting of an oxygen acid ester, isoxazole, oxazole, oxazoline and derivatives thereof is added to an organic solvent containing 10 wt % or more of dioxolane, the additive reacts with lithium, and a coating or film of good quality is formed on the negative electrode which comprises a metal oxide. The coating prevents direct contact of lithium and the solvent, and reduces decomposition of the nonaqueous electrolyte caused by the contact of lithium and the solvent. As a result, the storage properties are improved.

As the oxygen acid ester, trimethyl phosphate [$(CH_3O)_3PO$], tetrabutyl titanate [$(C_4H_9O)_4Ti$], trimethyl borate [$(CH_3O)_3B$], triethyl phosphate [$(C_2H_5O)_3PO$], tetraisopropyl titanate [$(C_3H_7O)_4Ti$], triethyl borate [$(C_2H_5O)_3B$], or the like can be illustrated.

Trimethyl phosphate is most preferable among the above mentioned oxygen acid esters to inhibit self-discharge. It is believed that the best coating on the negative electrode is formed or that trimethyl phosphate is the easiest of the oxygen acid esters to be adsorbed on the negative electrode.

The structural formula of isoxazole is shown below:

(I)

The structural formula of oxazole is shown below:

(II)

The structural formula of oxazoline is shown below:

(III)

The derivatives of isoxazole described above are those in which at least one of the hydrogens bonded to a carbon atom of the isoxazole is substituted by methyl(—$CH_3$), ethyl(—$C_2H_5$) or halogen (fluorine (F), chlorine (Cl) etc.). 3,5-Dimethyl isoxazole is illustrated as one of the derivatives of isoxazole. The chemical structure of 3,5-dimethyl isoxazole is shown below:

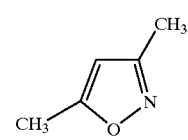

(IV)

The derivatives of oxazole are also defined the same as the derivatives of isoxazole, that is, at least one of the hydrogens bonded to a carbon atom of the oxazole is substituted by methyl (—$CH_3$), ethyl(—$C_2H_5$) or halogen (fluorine (F), chlorine (Cl) etc.). 4-Methyloxazole is illustrated as one of the derivatives of oxazole. The chemical structure of 4-methyloxazole is shown below:

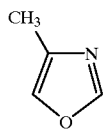

(V)

Derivatives of oxazoline are also defined the same as the derivatives of isoxazole or oxazole, that is, at least one of the hydrogens bonded to a carbon atom of the oxazole is substituted by methyl(—CH$_3$), ethyl(—C$_2$H$_5$) or halogen (fluorine (F), chlorine (Cl) etc.). 2-Methyl-2-oxazoline is an example of the derivatives of oxazoline. The chemical formula of 2-methyl-2-oxazoline is shown below:

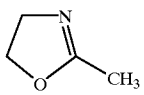

(VI)

3,5-Dimethyl isoxazole, oxazole and 2-methyl-2-oxazoline are preferable additives among those described above, because these compounds form easily the most suitable coating on the negative electrode or are adsorbed easily on the negative electrode. It is believed that these compounds (IV, II and VI) have structures which contact lithium easily, and react with lithium easily, or the electron distribution intramolecular of these compounds makes them easy to be adsorbed by lithium metal. Among these three compounds, when 3,5-dimethyl isoxazole is used as the additive, self-discharge rate can be well suppressed.

The amount of the additive is 0.01 wt % or more and 30.0 wt % or less based on the weight of the organic solvent. 0.1 wt % or more and 20.0 wt % or less are more preferable from the standpoint of reduction of the amount of discharge after storage of the nonaqueous electrolyte battery.

As a solute for the battery, LiPF$_6$, LiBF$_4$, LiClO$_4$, LiCF$_3$SO$_3$, LiAsF$_6$, LiN(CF$_3$SO$_2$)$_2$, LiN(C$_2$F$_5$SO$_2$)$_2$, LiCF$_3$(CF$_2$)$_3$SO$_3$, LiC(CF$_3$SO$_2$)$_3$, or the like. The solute is, of course, not limit to these and other solutes that do not adversely affect the storage property of the battery can be used.

As an organic solvent for this battery, there can be used dioxolane alone or an organic solvent containing 10 wt % or more of dioxolane mixed with ethylene carbonate, propylene carbonate, butylene carbonate, vinylene carbonate, dimethyl carbonate, diethyl carbonate, methyl ethyl carbonate, sulfolane and/or tetrahydrofuran.

A metal oxide containing at least one of manganese, cobalt, nickel, vanadium or niobium can be used as the positive electrode. Other materials that do not adversely affect the storage property of the batteries can be used.

The negative electrode for this battery is a material capable of absorbing and desorbing lithium ion electrochemically, or is metallic lithium. Graphite, coke, carbon materials (for example, calcined organic materials), and a lithium alloy are illustrative of the materials capable of absorbing and desorbing lithium ion electrochemically. As the lithium alloy, lithium-aluminum alloy, lithium-magnesium alloy, lithium-indium alloy, lithium-tin alloy, lithium-thallium alloy, lithium-lead alloy and lithium-bismuth alloy can be used.

Figure 1:
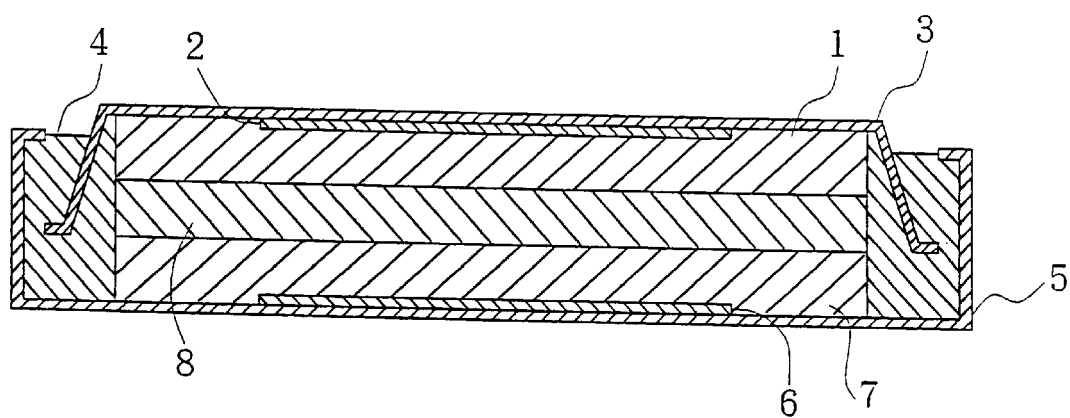
FIG. 1 is a sectional view of a nonaqueous electrolyte battery.

The following elements are shown in the drawing:
1 a negative electrode
2 a negative electrode collector
3 a negative can
4 an insulating packing
5 a positive can
6 a positive electrode collector
7 a positive electrode
8 a separator

DETAILED DESCRIPTION OF PREFERRED EMBODIMENTS

The present invention is described below in detail.

A sectional view of a coin-shaped nonaqueous electrolyte battery is illustrated in FIG. 1 as an embodiment of the present invention. Negative electrode (1) was press bonded to the inside surface of negative electrode collector (2). Negative electrode collector (2) was made of ferrite stainless steel (SUS430) and was secured in negative can (3) which was C-shaped in section. The edge of negative can (3) was secured in insulating packing (4) made of polypropylene. The outer edge of insulating packing (4) was covered by positive can (5) which was C-shaped in section. Positive electrode collector (6) was secured in positive can (5), and positive electrode (7) was secured to the inside of positive electorde collector (6). Separator (8) impregnated with a nonaqueous electrolyte was located between positive electrode (7) and negative electrode (1).

To illustrate the improved results obtained according to the present invention, batteries having a structure as shown in FIG. 1 were prepared as described above. Manganese dioxide treated at a temperature of 400° C. was used an active material of the positive electrode. (The heat treatment temperature can be changed in a range of 350~430° C.) The heat treated manganese dioxide was mixed with carbon powder as an electrically conducting agent and fluoro resin powder as a binder, at a ratio of 85:10:5 by weight. Then the mixture was press formed, and dried at a temperature of 300° C. to prepare positive electrode (7). (The drying temperature can be changed in a range of 250~350° C.) The negative electrode was prepared by cutting a pressed lithium sheet to a predetermined size. The electrolytes tested in the batteries are described in the following examples.

EXAMPLE 1

Trimethyl phosphate [(CH$_3$O)$_3$PO], which is an oxygen acid ester, and dioxolane (DOXL) were mixed at a ratio 9:1, 5:5 and 1:9 by weight to prepare solvent mixtures, and lithium tri(fluoro)methane sulfonate was added at a ratio of 1 mol/l to each solvent mixture as a solute to prepare nonaqueous electrolytes. Batteries A2 to A4, having an outer diameter of 20.0 mm and a thickness of 2.5 mm, were prepared using these nonaqueous electrolytes.

Storage property of each battery was tested as follows:

Each battery was discharged at room temperature and checked for discharge capacity. The discharge capacity of each battery was 80 mAh. Each battery was then stored at a temperature of 60° C. for two months, and thereafter discharged at room temperature at a discharge current of 6 mA to 2.0 V. The self-discharge rate was calculated as a percentage of the discharge capacity measured before storage. Results are shown in Table 1.

Comparative Example 1

Lithium tri(fluoro)methane sulfonate was added at a ratio of 1 mol/l to trimethyl phosphate [(CH$_3$O)$_3$PO] to prepare an electrolyte. Battery A1, having an outer diameter of 20.0 mm and a thickness of 2.5 mm, was prepared using this electrolyte.

The storage property of the battery was tested in the same manner as Example 1. The result is also shown in Table 1.

Comparative Example 2

Lithium tri(fluoro)methane sulfonate was added at a ratio of 1 mol/l to dioxolane (DOXL) to prepare an electrolyte. Battery A5, having an outer diameter of 20.0 mm and a thickness of 2.5 mm, was prepared using this electrolyte.

The storage property of the battery was tested in the same manner as Example 1. The result is shown in Table 1.

EXAMPLE 2

Batteries B2 to B4 were prepared in the same manner as Example 1 except that trimethyl borate [$(CH_3O)_3B$] was used instead of trimethyl phosphate.

The storage property of each battery was tested in the same manner as Example 1. Results are shown in Table 1.

Comparative Example 3

Battery B1 was prepared in the same manner as Comparative Example 1 except that trimethyl borate [$(CH_3O)_3B$] was used instead of trimethyl phosphate.

The storage property of the battery was tested in the same manner as Example 1. The result is shown in Table 1.

EXAMPLE 3

Batteries C2 to C4 were prepared in the same manner as Example 1 except that tetraisopropyl titanate [$(C_3H_7O)_4Ti$] was used instead of trimethyl phosphate.

The storage property of each battery was tested in the same manner as Example 1. Results are also shown in Table 1.

Comparative Example 4

Battery C1 was prepared in the same manner as Comparative Example 1 except that tetraisopropyl titanate [$(C_3H_7O)_4Ti$] was used instead of trimethyl phosphate.

The storage property of the battery was tested in the same manner as Example 1. The result is shown in Table 1.

phosphate, triethyl borate and tetrabutyl titanate, were used, very similar results were obtained.

EXAMPLE 4

Propylene carbonate (PC) and dioxolane (DOXL) were mixed at a ratio of 9:1, 5:5 and 0:10 by weight to prepare organic solvent mixtures, and lithium tri(fluoro)methane sulfonate was added at a ratio of 1 mol/l to the organic solvent mixtures as a solute. 3,5-Dimethyl isoxazole, which is a derivative of isoxazole, was added in an amount of 1.0 wt % of the weight of the organic solvent mixtures to prepare nonaqueous electrolytes. Batteries D3 to D5, having an outer diameter of 20.0 mm and a thickness of 2.5 mm, were prepared using these nonaqueous electrolytes.

The storage property of each battery was tested in the same manner as Example 1. The results are shown in Table 2.

Comparative Example 5

Batteries D1 and D2 were prepared in the same manner as Example 4 except that propylene carbonate (PC) and dioxolane (DOXL) were mixed at a ratio 10:0 and 95:5 by weight, respectively.

The storage property of each battery was tested in the same manner as Example 1. The results are shown in Table 2.

EXAMPLE 5

Batteries E3 to E5 were prepared in the same manner as Example 4 except that oxazole was used instead of 3,5-dimethyl isoxazole.

The storage property of each battery was tested in the same manner as Example 1. Results are also shown in Table 2.

Comparative Example 6

Batteries E1 and E2 were prepared in the same manner as Example 5 except that propylene carbonate (PC) and dioxolane (DOXL) were mixed at a ratio 10:0 and 95:5 by weight, respectively.

The storage property of each battery was tested in the same manner as Example 1. Results are shown in Table 2.

EXAMPLE 6

Batteries F3 to F5 were prepared in the same manner as Example 4 except that 2-methyl-2-oxazoline, which is one

TABLE 1

|  |  | Comparative Examples |  | Examples |  |  |  |  |  | Comparative Example |  |
|---|---|---|---|---|---|---|---|---|---|---|---|---|
| Mixing ratio (by weight) of oxygen acid ester: DOXL |  | 10:0 |  | 9:1 |  | 5:5 |  | 1:9 |  | 0:10 |  |
| Additive | Trimethyl phosphate | A1 | 12.0 | A2 | 7.0 | A3 | 4.1 | A4 | 7.1 | A5 | 12.0 |
|  | Trimethyl borate | B1 | 12.0 | B2 | 7.2 | B3 | 4.3 | B4 | 7.1 |  |  |
|  | Tetraisopropyl titanate | C1 | 12.0 | C2 | 7.1 | C3 | 4.2 | C4 | 7.0 |  |  |

The batteries of the present invention, A2 to A4, B2 to B4 and C2 to C4, had lower self-discharge rates compare to comparative batteries, A1, A5, B1 and C1. This means that a reduction in the capacity of the batteries was suppressed. It is noted that battery A5 does not include an oxygen acid ester.

Only embodiments of the use of various amounts of trimethyl phosphate, trimethyl borate and tetraisopropyl titanate as oxygen acid esters were illustrated in Examples 1 to 3, however, when other oxygen acid esters, i.e., triethyl of the derivatives of oxazoline, was used instead of 3,5-dimethyl isoxazole.

The storage property of each battery was tested in the same manner as Example 1. Results are also shown in Table 2.

Comparative Example 7

Batteries F1 and F2 were prepared in the same manner as Example 6 except that propylene carbonate (PC) and dioxolane (DOXL) were mixed at a ratio 10:0 and 95:5 by weight, respectively.

The storage property of each battery was tested in the same manner as Example 1. Results are shown in Table 2.

Comparative Example 8

Propylene carbonate (PC) and dioxolane (DOXL) were mixed at a ratio of 10:0, 95:5, 9:1, 5:5 and 0:10 by weight to prepare solvent mixtures, and lithium tri(fluoro)methane sulfonate was added at a ratio of 1 mol/l to prepare nonaqueous electrolytes. Batteries X1 to X5, having an outer diameter of 20.0 mm and a thickness of 2.5 mm, were prepared using these nonaqueous electrolytes.

The storage property of each battery was tested in the same manner as Example 1. Results are shown in Table 2.

TABLE 2

| Mixing ratio of solvent by weight (PC:DOXL) | | 10:0 | 95:5 | 9:1 | 5:5 | 0:10 |
|---|---|---|---|---|---|---|
| Additive | 3,5-Dimethyl isoxazole | D1 9.0 | D2 8.0 | D3 4.0 | D4 3.1 | D5 2.7 |
| | Oxazole | E1 9.0 | E2 8.0 | E3 4.2 | E4 3.2 | E5 2.9 |
| | 2-Methyl-2-oxazoline | F1 9.0 | F2 8.0 | F3 4.4 | F4 3.4 | F5 3.1 |
| | None | X1 9.0 | X2 9.5 | X3 10.0 | X4 11.0 | X5 12.0 |

 The data inside of the double line represent embodiments of the present invention.

The batteries of the present invention, D3 to D5, E3 to E5 and F3 to F5, had significantly smaller self-discharge rates than comparative batteries D1, D2, E1, E2, F1, F2 and X1 to X5 as shown in Table 2. The results demonstrate that batteries of the present invention are prevented from having a large reduction of capacity during storage, and self discharge is inhibited.

EXAMPLE 7

Batteries having the same structures as batteries D4, E4 and F4, and specified amounts of 3,5-dimethyl isoxazole, oxazole and 2-methyl-2-oxazoline were prepared.

Storage property of the batteries was tested by measurement of discharge of the batteries (mAh) after two months storage at a temperature of 60° C. Test results are shown in Table 3.

The amounts of 3,5-dimethyl isoxazole, oxazole and 2-methyl-2-oxazoline and self-discharge rates are shown in Table 3. Self-discharge rate was calculated in the same manner in Example 1.

TABLE 3

| | Self-discharge rate (%) | | |
|---|---|---|---|
| Amount added (wt %) | 3,5-Dimethyl isoxazole | Oxazole | 2-Methyl-2-oxazoline |
| 0 | 11.0 | 11.0 | 11.0 |
| 0.01 | 7.5 | 7.4 | 7.5 |
| 0.1 | 6.0 | 6.0 | 6.0 |
| 1 | 3.1 | 3.2 | 3.4 |
| 5 | 2.7 | 2.6 | 4.0 |
| 10 | 3.9 | 3.8 | 4.6 |
| 20 | 5.9 | 6.0 | 6.1 |
| 30 | 7.4 | 7.5 | 7.6 |

When 3,5-dimethyl isoxazole, oxazole and 2-methyl-2-oxazoline were added to the nonaqueous electrolyte in an amount of 0.01 wt % to 30.0 wt % based on the weight of the organic solvent, self-discharge rates were improved. This range was effective to improve storage stability. Especially, an amount in the range of 0.1 wt % to 20.0 wt % was preferable from the standpoint that discharge capacity after storage was not significantly reduced.

Only test results when amounts of 3,5-dimethyl isoxazole, oxazole and 2-methyl-2-oxazoline were varied are shown above. However, the same tendency is observed when other derivatives of the compounds used in Example 7, i.e., isoxazole or oxazoline, were used.

ADVANTAGE OF THE INVENTION

Storage property of lithium battery can be improved by the addition of a storage stabilizing additive selected from the group consisting of an oxygen acid ester, isoxazole, oxazole, oxazoline and derivatives thereof to a nonaqueous electrolyte containing 10 wt % or more of dioxolane. Improvement of the storage property by the present invention is excellent, and the value of the present invention is industrially significant.

What is claims is:

1. A nonaqueous electrolyte battery comprising a positive electrode which comprises a metal oxide, a negative electrode containing lithium or a material capable of absorbing and desorbing lithium, and a nonaqueous electrolyte comprising an organic solvent containing dioxolane and a solute, wherein said dioxolane is at least 10 wt % of said organic solvent, and said organic solvent contains a storage stabilizing additive which consists of a boric ester, titanic ester or a mixture thereof.

2. A nonaqueous electrolyte battery according to claim 1, wherein said stabilizing additive consists of trimethyl borate.

3. A nonaqueous electrolyte battery according to claim 1, wherein said stabilizing additive consists of tetraisopropyl titanate.

4. A nonaqueous electrolyte battery according to claim 1, wherein the positive electrode comprises manganese oxide.

5. A nonaqueous electrolyte battery comprising a positive electrode which comprises a metal oxide, a negative electrode containing lithium or a material capable of absorbing and desorbing lithium, and a nonaqueous electrolyte comprising an organic solvent containing dioxolane and a solute, wherein said dioxolane is at least 10 wt % of said organic solvent, and said organic solvent contains a storage stabilizing additive which consists of oxazole, 2-methyl-2-oxazoline or a mixture thereof.

6. A nonaqueous electrolyte battery according to claim 5, wherein the positive electrode comprises manganese oxide.

7. A nonaqueous electrolyte battery comprising a positive electrode which comprises a metal oxide, a negative electrode containing lithium or a material capable of absorbing and desorbing lithium, and a nonaqueous electrolyte comprising an organic solvent containing dioxolane and a solute, wherein said dioxolane is at least 10 wt % of said organic solvent, and said organic solvent contains a storage stabilizing additive which consists of oxazole, oxazoline or a derivative thereof and is present in an amount in a range of 0.01 wt % to 30.0 wt % based on the weight of said organic solvent.

8. A nonaqueous electrolyte battery according to claim 7, wherein the amount of said storage stabilizing additive is 0.1 wt % to 20.0 wt % based on the weight of said organic solvent.

9. A nonaqueous electrolyte battery according to claim 7, wherein the positive electrode comprises manganese oxide.

* * * * *

UNITED STATES PATENT AND TRADEMARK OFFICE
CERTIFICATE OF CORRECTION

PATENT NO. : 6,255,021 B1
DATED : July 3, 2001
INVENTOR(S) : Yasuyuki Kusmoto

It is certified that error appears in the above-identified patent and that said Letters Patent is hereby corrected as shown below:

Column 2,
Lines 9-10, "[(CH$_3$O)PO]" should be -- [(CH$_3$O)$_3$PO] --

Signed and Sealed this

Third Day of September, 2002

Attest:

Attesting Officer

JAMES E. ROGAN
Director of the United States Patent and Trademark Office